United States Patent
Moeller et al.

(10) Patent No.: US 10,343,475 B2
(45) Date of Patent: Jul. 9, 2019

(54) BEARING MECHANISM FOR A TRANSVERSE LEAF SPRING, MOUNTABLE IN THE AREA OF A VEHICLE AXLE

(71) Applicant: ZF Friedrichshafen AG, Friedrichshafen (DE)

(72) Inventors: Matthias Moeller, Buende (DE); Volker Wagner, Ravensburg (DE); Thomas Rupflin, Stetten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/915,316

(22) PCT Filed: Aug. 14, 2014

(86) PCT No.: PCT/EP2014/067445
§ 371 (c)(1),
(2) Date: Feb. 29, 2016

(87) PCT Pub. No.: WO2015/036199
PCT Pub. Date: Mar. 19, 2015

(65) Prior Publication Data
US 2016/0207370 A1    Jul. 21, 2016

(30) Foreign Application Priority Data
Sep. 10, 2013  (DE) .................. 10 2013 218 055

(51) Int. Cl.
*B60G 11/12* (2006.01)
*B60G 11/08* (2006.01)
*F16F 1/368* (2006.01)

(52) U.S. Cl.
CPC .............. *B60G 11/12* (2013.01); *B60G 11/08* (2013.01); *F16F 1/3683* (2013.01);
(Continued)

(58) Field of Classification Search
CPC . F16F 1/3683; B60G 2204/121; B60G 11/12; B60G 11/08; B60G 2202/114; B60G 2204/41; B60G 2206/7101
See application file for complete search history.

(56) References Cited

U.S. PATENT DOCUMENTS 2,697,613 A * 12/1954 Giacosa ................... B01J 19/22
   267/230
3,181,641 A *  5/1965 Haddad .................. B60G 11/08
   180/256
(Continued)

FOREIGN PATENT DOCUMENTS

DE  42 01 180 A1  7/1992
DE  38 73 705 T2  3/1993
(Continued)

OTHER PUBLICATIONS

German Search Report Corresponding to 10 2013 218 055.1 dated May 26, 2014.
(Continued)

*Primary Examiner* — Xuan Lan Nguyen
(74) *Attorney, Agent, or Firm* — Davis & Bujold PLLC; Michael J. Bujold (57) ABSTRACT

A bearing mechanism for a transverse leaf spring can be fitted in the area of a vehicle axle and has a holding device for holding the transverse leaf spring and a connecting device via for connecting the holding device to the vehicle. The holding and connecting devices and the transverse spring are designed such that when the transverse spring is in its installed position a cross-sectional plane of the transverse spring, that extends in the vertical and longitudinal directions of the vehicle, can pivot in the area of the mounting fixture during jouncing and rebound of the transverse spring, about a rotational axis that extends in the longitudinal direction. The holding and connecting devices,
(Continued)

in the area of the mounting fixture, are designed such that the rotational axis of the cross-sectional plane of the transverse spring is vertically spaced from the neutral fiber of the transverse spring.

6 Claims, 7 Drawing Sheets

(52) U.S. Cl.
CPC .. *B60G 2202/114* (2013.01); *B60G 2204/121* (2013.01); *B60G 2204/41* (2013.01); *B60G 2206/7101* (2013.01)

(56) References Cited

U.S. PATENT DOCUMENTS

| | | | |
|---|---|---|---|
| 4,598,900 A | * | 7/1986 | Yamamoto ............ B29C 53/562 267/149 |
| 4,643,406 A | * | 2/1987 | Mounier-Poulat .... B60G 11/113 267/148 |
| 4,749,206 A | | 6/1988 | Delery et al. |
| 4,768,807 A | * | 9/1988 | McGibbon ............. B60G 11/08 267/269 |
| 4,895,350 A | * | 1/1990 | Schoof ................. B60G 11/113 267/52 |
| 5,016,861 A | | 5/1991 | Thompson et al. |
| 5,251,930 A | | 10/1993 | Kusaka et al. |
| 8,360,453 B2 | | 1/2013 | Fruhmann et al. |
| 8,814,191 B2 | | 8/2014 | Lindtner |
| 2012/0286492 A1 | | 11/2012 | Sjoesten et al. |

FOREIGN PATENT DOCUMENTS

| | | |
|---|---|---|
| DE | 10 2009 028 574 A1 | 2/2011 |
| DE | 10 2009 028 900 A1 | 3/2011 |
| EP | 0 994 270 A2 | 4/2000 |
| EP | 2 604 453 A1 | 6/2013 |
| JP | H07-257131 A | 10/1995 |
| WO | 96/27507 A1 | 9/1996 |

OTHER PUBLICATIONS

International Search Report Corresponding to PCT/EP2014/067445 dated Nov. 6, 2014.
Written Opinion Corresponding to PCT/EP2014/067445 dated Nov. 6, 2014.

* cited by examiner

BEARING MECHANISM FOR A TRANSVERSE LEAF SPRING, MOUNTABLE IN THE AREA OF A VEHICLE AXLE

This application is a National Stage completion of PCT/EP2014/067445 filed Aug. 14, 2014, which claims priority from German patent application serial no. 10 2013 218 055.1 filed Sep. 10, 2013.

FIELD OF THE INVENTION

The invention concerns a bearing mechanism for a transverse leaf spring, mountable in the area of a vehicle.

BACKGROUND OF THE INVENTION

For some time leaf springs have been used in automotive engineering, which however are nowadays made from glass-fiber-reinforced plastic in order to be able to fulfill weight-saving demands. Such GFR (Glass Fiber Reinforced) transverse leaf springs are also intended to perform wheel-guiding tasks and to replace three previously essential components of a vehicle axle. Those components are a so-termed body spring, a stabilizer and a transverse control arm.

To perform the wheel-guiding functions transverse forces have to be introduced into the GFR transverse leaf spring and supported by means of central mountings in the area of the vehicle body. The central mountings always represent a compromise between the mobility of the GFR transverse leaf spring and the transverse force to be supported in each case. It is true that the GFR material used in each case for making a GFR transverse spring is light and correspondingly innovative, but as regards the input and output of the force, appropriate design measures are required.

This results from the fact that depending on the axle kinematics existing in each case, differently sized lateral movements of the GFR transverse leaf spring in the central mountings can occur, which are superimposed with rotation that in turn takes place during jouncing or rebound processes of the GFR transverse leaf spring. In the area of the mounting points of the GFR transverse leaf spring, a combination of these movements produces bearing forces whose result is that a mounting design suitable for a particular axle kinematic is completely unusable with a different axle kinematic and causes premature impairment of the function of the GFR transverse leaf spring.

From DE 10 2009 028 900 A1 a bearing mechanism for a transverse leaf spring is known, which comprises a mounting outer shell device and insertion devices at least partially surrounded by the mounting outer shell device, each having sheet elements of different rigidity. In the assembled condition the insertion devices are in each case arranged between the mounting outer shell device and the transverse leaf spring. Sheet elements with higher rigidity are in each case positioned between the transverse leaf spring and sheet elements with lower rigidity. The sheet elements with higher rigidity are in the form of convex half-shells between end areas orientated in the axial direction of the transverse leaf spring. The end areas of the more rigid sheet members have portions curved concavely relative to the surface of the transverse leaf spring, whose free ends are directed away from the surface of the transverse leaf spring. The sheet elements formed with lower rigidity and the sheet elements adjacent to the transverse leaf spring partially surround the less rigid sheet elements with their free ends.

The mounting design of the bearing mechanism is symmetrical, whereby when the transverse leaf spring is in its fitted position a cross-sectional plane of the transverse leaf spring that extends essentially in the vertical and longitudinal directions of the vehicle in the area of the bearing mechanism can pivot, during jouncing and rebounds of the transverse leaf spring, about a rotational axis extending essentially in the longitudinal direction of the vehicle, which, without producing undesired constraining forces in the area of the transverse leaf spring, must as a result of the design be located in the area of the neutral fiber of the transverse leaf spring.

SUMMARY OF THE INVENTION

Accordingly, the purpose of the present invention is to provide a bearing mechanism for a transverse leaf spring, which can be fitted in the area of a vehicle axle of a vehicle, by means of which constraining forces in the area of a transverse leaf spring can be reduced during jouncing and rebound of the transverse leaf spring.

This objective is achieved with a bearing mechanism having the characteristics described below.

In the case of a bearing mechanism for a transverse leaf spring, which can be fitted in the area of a vehicle axle of a vehicle and which is formed with a holding device for holding the transverse leaf spring and with a connecting device in the area of which the holding device can be connected to the vehicle, the holding device, the connecting device and the transverse leaf spring are matched to one another in such manner that when the transverse leaf spring is in its installed position, during jouncing and rebound of the transverse leaf spring a cross-sectional plane of the transverse leaf spring, which extends essentially in the vertical and longitudinal directions of the vehicle in the area of the bearing mechanism, can pivot about a rotational axis that extends essentially in the longitudinal direction of the vehicle.

The holding device and the connecting device are designed in such manner that the rotational axis of the cross-sectional plane of the transverse leaf spring in the area of the bearing mechanism is a distance away from the neutral fiber of the transverse leaf spring, in order to minimize constraining forces in the vertical direction of the vehicle that occur during jouncing and rebound processes of the transverse leaf spring.

The invention is based on the recognition that the rotational axis or an instant center of rotation of the cross-sectional plane of the transverse leaf spring is not in the area of the neutral fiber of the transverse leaf spring, but rather, a distance away from the neutral fiber, since the transverse leaf spring is usually connected to the vehicle body in the transverse direction of the vehicle in a bent, pre-stressed position and accordingly, by virtue of its shape the spring elongates during a jouncing process. In the central mounting area or in the area of the bearing mechanism of the transverse leaf spring the elongation of the transverse leaf spring gives rise to lateral movements which result, among other things, in displacement of the instant center of rotation relative to the neutral fiber of the transverse leaf spring, essentially in the vertical direction of the vehicle. By virtue of the asymmetrical or off-center central mounting, despite the above-described lateral movements the load situation existing over the full operating range of the transverse leaf spring can be substantially eased, whereby the life of a transverse leaf spring can be improved in a simply designed manner.

Since the distance of the rotational axis or actual kinematic point of the cross-sectional plane of the transverse leaf spring varies from the neutral fiber of the transverse leaf spring varies as a function of the load situation at the time, the bearing mechanism should preferably be designed such that the position of the rotational axis of the cross-sectional plane of the transverse leaf spring in the fitted operating condition of the transverse leaf spring, which is defined by the design of the bearing mechanism, is arranged in a position such as to maximize the life of the transverse leaf spring.

In a simply designed embodiment of the bearing mechanism, the holding device comprises two half-shells that can be connected to one another, which at least partially surround the transverse leaf spring with interlock, at least one of the half-shells being coupled to the connecting device.

If in each case the connecting device comprises a connection area attached to the holding device and a further connection area by means of which the connection device can be brought into functional connection with the vehicle, and if the connection areas are coupled to one another by an additional connection area having greater elasticity than the aforesaid connection and further connection areas, then lateral and pivoting movements of the transverse leaf spring are possible at the same time as lower constraining forces and a transverse leaf spring can be fitted with little effort in the area of a vehicle.

If in the installed position of the transverse leaf spring in the vehicle the connecting device is arranged at least partially over an upper side of the transverse leaf spring, then the distance between the rotational axis of the cross-sectional plane and the neutral fiber of the transverse leaf spring can be increased with little effort.

In a further advantageous embodiment of the bearing mechanism, in the installed position of the transverse leaf spring the connecting device is arranged at least partially in front of and behind the transverse leaf spring in the longitudinal direction of the vehicle, whereby smaller distances between the rotational axis and the neutral fiber can be obtained without having to make adaptations related to the design of the transverse leaf spring.

If in each case the connecting device comprises connection areas attached to the half-shells of the holding device and of semi-cylindrical shape, which in the installed position of the transverse leaf spring extend away from it in the longitudinal direction of the vehicle and which in the installed condition of the holding device rest against one another on their flat sides and form a cylindrical area such that in the installed position of the transverse leaf spring the centerlines of the cylindrical areas extend in the longitudinal direction and are offset in the vertical direction of the vehicle from a plane of symmetry of the holding device, which plane preferably passes through the neutral fiber of the transverse leaf spring, and constitute a rotational axis of the connection areas relative to the other connection areas, then a distance between the rotational axis of the cross-sectional plane of the transverse leaf spring and the neutral fiber of the transverse leaf spring in the area of the bearing mechanism can be adjusted in a simply designed manner to any desired extent, regardless of the design of the transverse leaf spring.

If the further, additional connection area, which is in the form of a hollow-cylindrical component and is surrounded by the further connection area, is pushed onto the cylindrical area, the bearing mechanism is of simple design and can be fitted with little effort.

In a particularly simple embodiment of the bearing mechanism, the connecting device has at least one hollow-cylindrically shaped connection area, which is attached to one of the half-shells and, in the installed position of the transverse leaf spring extends in the longitudinal direction of the vehicle and which surrounds the also hollow-cylindrical further connection area and the additional connection are between them, which is also of hollow-cylindrical form. In that way the bearing mechanism can be made for example as a so-termed circular bearing mechanism which is inexpensive and space-saving.

If the connection area and the additional connection area each have two portions a distance apart from one another in the longitudinal direction of the vehicle, one of these portions being forward of the transverse leaf spring in the longitudinal direction of the vehicle and the other portion being behind the transverse leaf spring, and if the parts of the additional connection area surround the portions of the further connection area, and if these are arranged on the connection area which is in the form of a hollow-cylindrical component extending in the longitudinal direction of the vehicle between the parts, then even small distances between the rotational axis of the cross-sectional plane of the transverse leaf spring and the neutral fiber of the transverse leaf spring can be realized with a so-termed circular bearing mechanism, without having for this to modify a design of a conventionally made transverse leaf spring.

If the half-shells of the holding device are made with recesses for receiving convex areas of the transverse leaf spring, then relative movements between the transverse leaf spring and the bearing mechanism in the transverse direction of the vehicle in the area of the bearing mechanism can be restricted or avoided, and at the same time stress forces can be kept low, with little design effort.

Both the features indicated in the claims and those described in the following example embodiments are in each case suitable, whether in isolation or in any combination with one another, as further developments of the object of the invention. In relation to the further development of the object of the invention, the respective combinations of features do not constitute any limitation, but are presented essentially only as examples.

BRIEF DESCRIPTION OF THE DRAWINGS

Further advantages and advantageous further developments of the invention emerge from the claims and from the example embodiments whose principle is described with reference to the drawing, wherein for the sake of clarity the same indexes are used for structurally and functionally equivalent components.

The drawing shows.

DETAILED DESCRIPTION OF THE PREFERRED EMBODIMENTS

Figure 1:
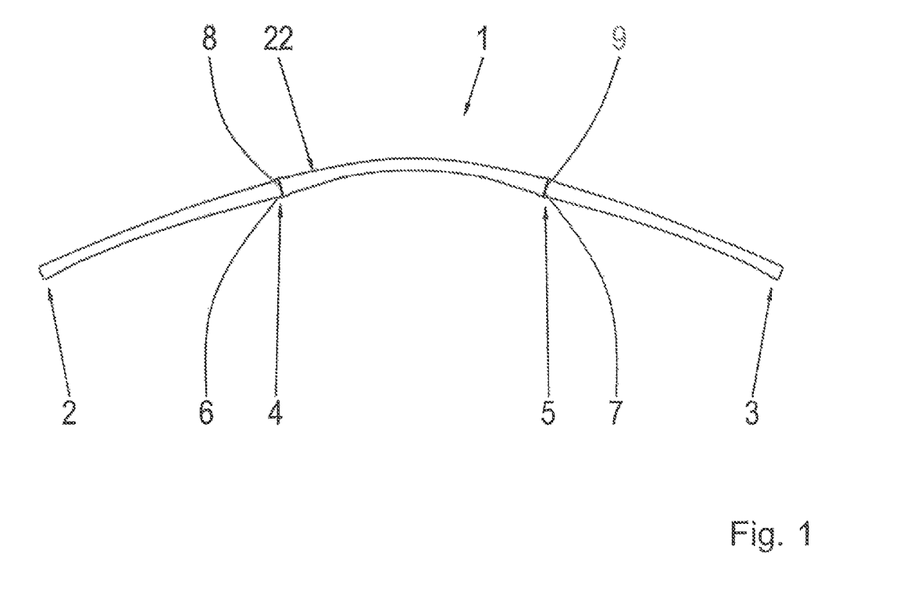
FIG. 1: A schematic representation of a transverse leaf spring in the rest position.

FIG. 1 shows a schematic representation of a transverse leaf spring 1 which can be fitted in the area of a vehicle axle of a vehicle, extending essentially in the transverse direction of the vehicle. In its end areas 2, 3 facing the wheels of the vehicle axle, the transverse leaf spring 1 can be mounted in outer mountings or guide mountings and can be connected to wheel carriers.

In the central area 4, 5 of the transverse leaf spring 1, by means of central mountings not shown in FIG. 1 the transverse leaf spring can be brought into functional connection directly with a vehicle body or with an auxiliary frame in turn connected to the vehicle body, and mounted thereon. The central mountings or bearing mechanisms are arranged symmetrically around the middle of the transverse leaf spring 1 and in the installed position of the transverse leaf spring 1 connect it to the vehicle body of the vehicle, in such manner that rotations of the transverse leaf spring 1 in the area of the bearing mechanisms are possible to the required extent during same-sided and converse spring movements, such that by virtue of the transverse leaf spring 1, during same-sided and during converse jouncing at the end areas different spring rates can be obtained.

In the transverse direction of the vehicle the bearing mechanisms have high mounting rigidity and deform only slightly in the transverse direction of the vehicle during operation of a vehicle having the transverse leaf spring 1 and the bearing mechanisms, so as to be able, besides the above-described spring functions, also to perform wheel-guiding tasks. The high mounting rigidity of the bearing mechanisms in the transverse direction of the vehicle also makes it possible in a simple manner to avoid displacement of the transverse leaf spring 1 as a whole in the transverse direction of the vehicle.

To produce the interlock required in each case between the bearing mechanisms and the transverse leaf spring 1 for the proper function of the transverse leaf spring 1, the two bearing mechanisms are also made with correspondingly high mounting rigidity in the vertical direction of the vehicle. Moreover, a result of the high mounting rigidity of the bearing mechanisms in the vertical direction of the vehicle is that during converse jouncing of the end areas 2, 3 the transverse leaf spring 1 is not displaced in the area of the bearing mechanisms as a solid body would be.

Figure 2:
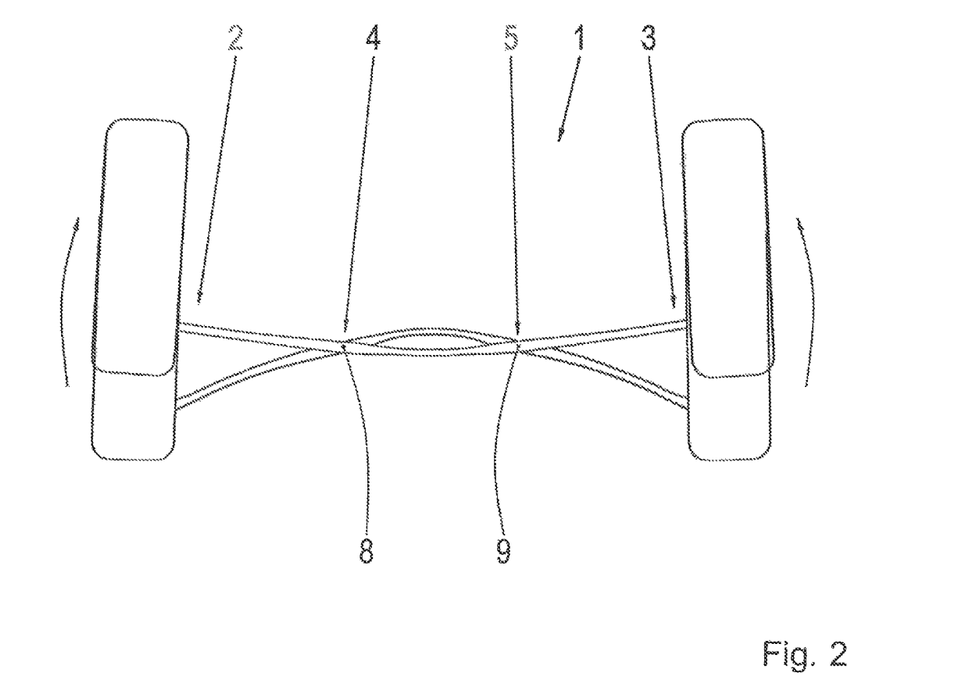
FIG. 2: A representation corresponding essentially to FIG. 1, of a transverse leaf spring, wherein the transverse leaf spring is shown in the rest position and by comparison therewith, in an operating condition in which it is compressed downward equally on both sides.
Figure 3:
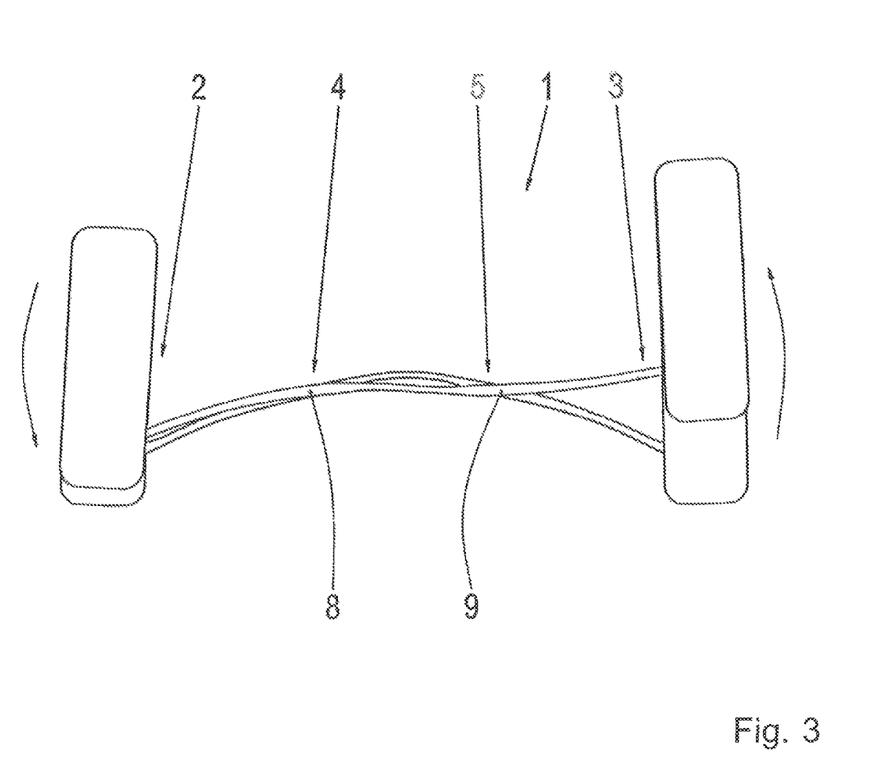
FIG. 3: A representation corresponding to FIG. 2, of a transverse leaf spring in the rest position and by comparison therewith, in an operating condition in which the transverse leaf spring is in an rebound condition on one side and in a downward-compressed condition on the other side.

FIG. 2 shows a comparison of the transverse leaf spring 1 in its rest position and in an operating condition in which the two ends areas 2, 3 of the transverse leaf spring 1 are compressed downward by the same amount. In contrast, FIG. 3 shows a comparison of the transverse leaf spring 1 in its rest position and in a converse spring operation condition in which the end area 2 of the transverse leaf spring 1 is extended away from the rest position while the end area 3 of the transverse leaf spring 1 is compressed downward from the rest position. As shown in FIG. 3, during such converse jouncing the transverse leaf spring 1 is correspondingly deformed selectively into a so-termed S-shape and has a correspondingly higher converse spring rate.

By virtue of the transverse leaf spring 1 formed as a beam-like spring element made from a fiber composite material, besides an up-and-down suspension action a rolling suspension action can also be obtained, so that conventional body springs and stabilizer devices known from practice do not have to be provided.

Depending on the spring operation condition of the transverse leaf spring 1, when the transverse leaf spring 1 is in its installed position a cross-sectional plane 6 or 7 of the transverse leaf spring 1 that extends essentially in the vertical and longitudinal directions of the vehicle in the area of the bearing mechanism or the central area 4, 5 of the transverse leaf spring 1 pivots during jouncing and rebound of the transverse leaf spring 1 about a rotational axis 8, 9 that extends essentially in the longitudinal direction of the vehicle, the position of the rotational axes 8, 9 being shown in an idealized manner in FIG. 1 in the area of the neutral fiber of the transverse leaf spring 1. In the installed operating condition and in the rest position of the transverse leaf spring 1, the cross-sectional plane 6, 7 is slightly tilted by a few degrees relative to the vertical axis of the vehicle, since the transverse leaf spring 1 in its installed and rest position is curved in the manner shown in FIG. 1 and attached to the vehicle with some pre-stress.

Since during the operation of a vehicle in comparable load situations and comparable spring operation conditions the cross-sectional planes 6 and 7 of the central areas 4 and 5 are tilted essentially to the same extent, in the description given below reference will only be made to the cross-sectional plane 6 of the central area 4 of the transverse leaf spring 1.

Figure 4:
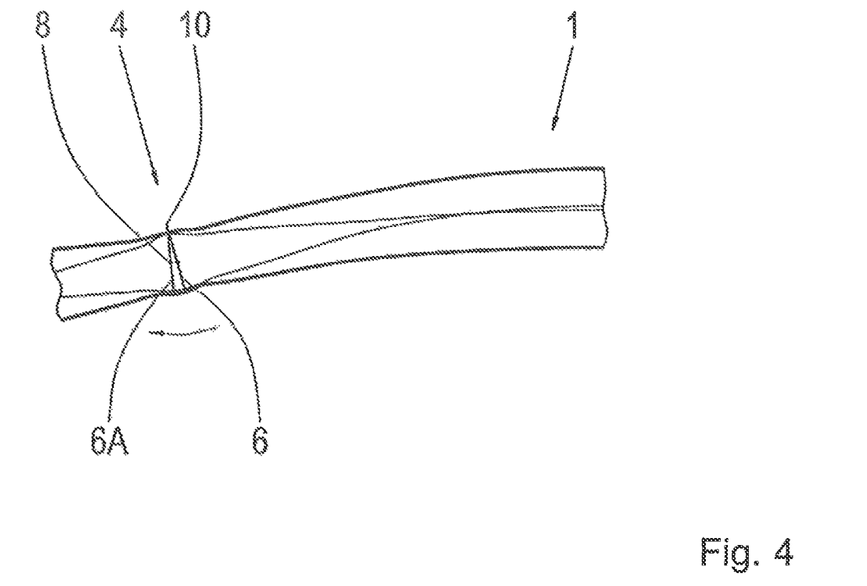
FIG. 4: Part of a transverse leaf spring in the area of a bearing mechanism, in the rest condition and by comparison therewith, during a spring operation condition in which the ends of the transverse leaf spring are pivoted away from their rest operating condition.

FIG. 4 shows a section of the transverse leaf spring 1 containing the central area 4 in its rest operating condition and in a sprung operating condition, in which the cross-sectional plane 6 is tilted away from the position equivalent to the rest operating condition, about an actual rotational axis 10 that corresponds to the current load condition, to the position equivalent to the spring operating condition, which is denoted in FIG. 4 by the index 6A. The cross-sectional plane 6A of the central area 4 of the transverse leaf spring 1, tilted in a load-dependent manner, results from rotation and translation of the cross-sectional plane 6 during the jouncing of the transverse leaf spring 1. During this the actual rotational axis 10 represents the instant center of rotation of the cross-sectional plane 6, about which the cross-sectional plane 6 is pivoted to the position indexed 6A.

Figure 5:
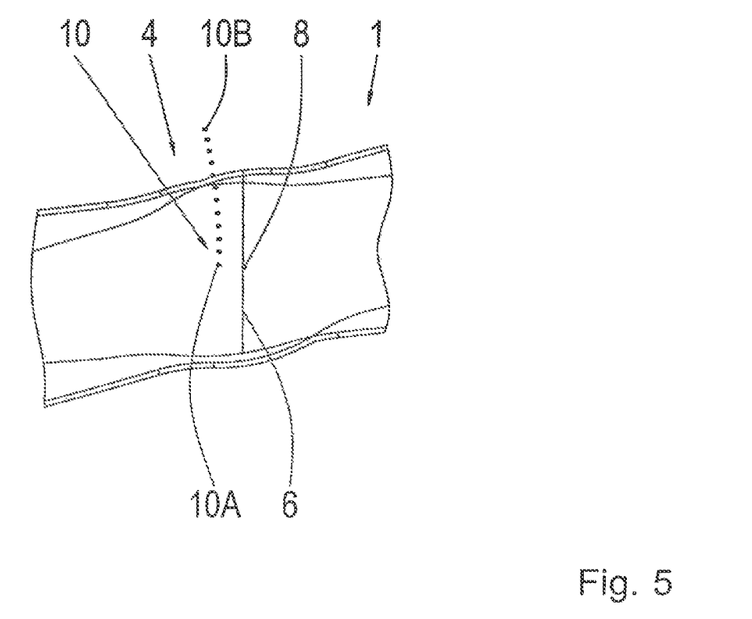
FIG. 5: An enlarged view of the part of a transverse leaf spring in the area of a bearing mechanism, with several rotational axes of a cross-sectional plane of the transverse leaf spring that are produced by various load conditions during an operating condition in which the spring is compressed downward on both sides.

FIG. 5 again shows a section of the transverse leaf spring 1 containing the central area 4, in the rest position and in a spring operating condition produced by same-side jouncing of the end areas 2 and 3 of the transverse leaf spring 1. Besides the theoretical rotational axis 8, FIG. 5 shows a number of actual rotational axes 10 or instant centers of rotation of the cross-sectional plane 6 of the transverse leaf spring 1 in the central area 4, produced during same-sided jouncing or rebound of the end areas 2 and 3 of the transverse leaf spring 1. In this case the cross-sectional plane 6 is tilted about the lowest actual rotational axis 10A when the two end areas 2 and 3 are compressed to the maximum extent. In contrast, the cross-sectional plane 6 of the transverse leaf spring 1 in the central area 4 is tilted about the uppermost actual rotational axis 10B when the two end areas 2 and 3 have rebounded to the maximum extent. The rotational axes of the cross-sectional plane 6 shown between the lower actual rotational axis 10A and the uppermost actual rotational axis 10B then show in each case the instant centers of rotation of the cross-sectional plane 6 during so-termed intermediate operating conditions of the transverse leaf spring 1 between the maximum jounced operating condition and the maximum rebounded operating condition. From the representation in FIG. 5 it can also be seen that between the actual rotational axis 10A and the theoretical rotational axis 8 there is a minimum offset, whereas the actual rotational axis 10B is a maximum distance away from the theoretical rotational axis 8.

Since the design of conventional bearing mechanisms is matched to the transverse leaf spring 1 in such manner that when there occurs a tilting or pivoting movement of the cross-sectional plane 6 in the central area 4 about the theoretical rotational axis 8, no or only small constraining forces are produced in the area of the transverse leaf spring 1, the result of the load-dependent distances between the actual rotation axes 10A to 10B and the theoretical rotational axis 8 in the vertical direction of the vehicle is that in the area of the transverse leaf spring 1, increasing constraining forces are introduced into the transverse leaf spring 1 as the distance between the actual rotational axes 10A to 10B and the theoretical rotational axis 8 increases, which forces affect the life of the transverse leaf spring 1 adversely to an undesired extent.

Figure 6:
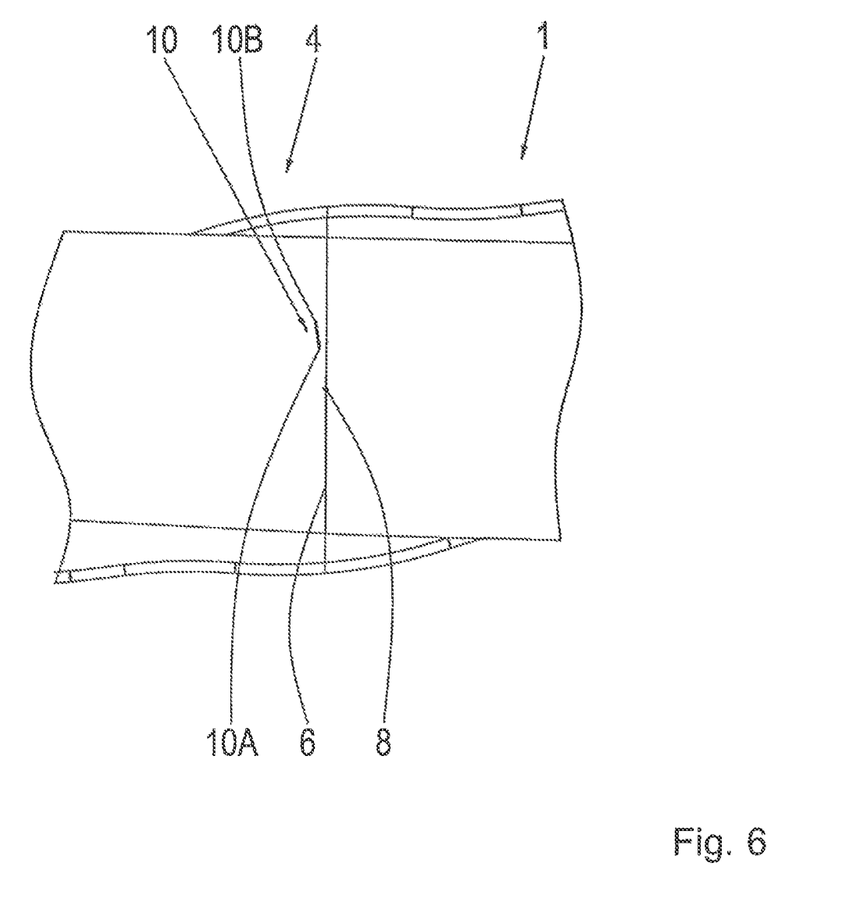
FIG. 6: A representation corresponding to FIG. 5, of a transverse leaf spring with rotational axes of the cross-sectional plane of the transverse leaf spring, which are produced in the area of the bearing mechanism as a function of various load conditions of the transverse leaf spring during alternate spring operating conditions thereof.

Even in a converse sprung operating condition of the transverse leaf spring 1 in which the end area 2 is compressed downward and the opposite end area 3 has rebounded, or the end area 2 has rebounded and the opposite end area 3 is compressed downward, the actual rotational axes 10A to 10B are a distance apart from the theoretical rotational axis 8 of the cross-sectional plane 6 of the transverse leaf spring 1 as shown in detail in FIG. 6. With converse sprung operating conditions, owing to the oppositely acting effects, namely the extension of the length of the transverse leaf spring 1 on one side and the shortening of its length on the other side in the transverse direction of the vehicle, the distance between the actual rotational axes 10A to 10B and the theoretical rotational axis 8 is smaller than when the sprung operating condition of the transverse leaf spring 1 is the same on both sides. Yet, even with converse sprung operating conditions of the transverse leaf spring 1 there is still a substantial offset between the actual rotational axes 10A to 10B and the theoretical rotational axis 8 of the transverse leaf spring 1, which in a mounting design matched to the theoretical rotational axis 8 gives rise to constraining forces in the area of the transverse leaf spring 1 which in some circumstances have a disadvantageous effect on the life of the transverse leaf spring 1.

Figure 7:
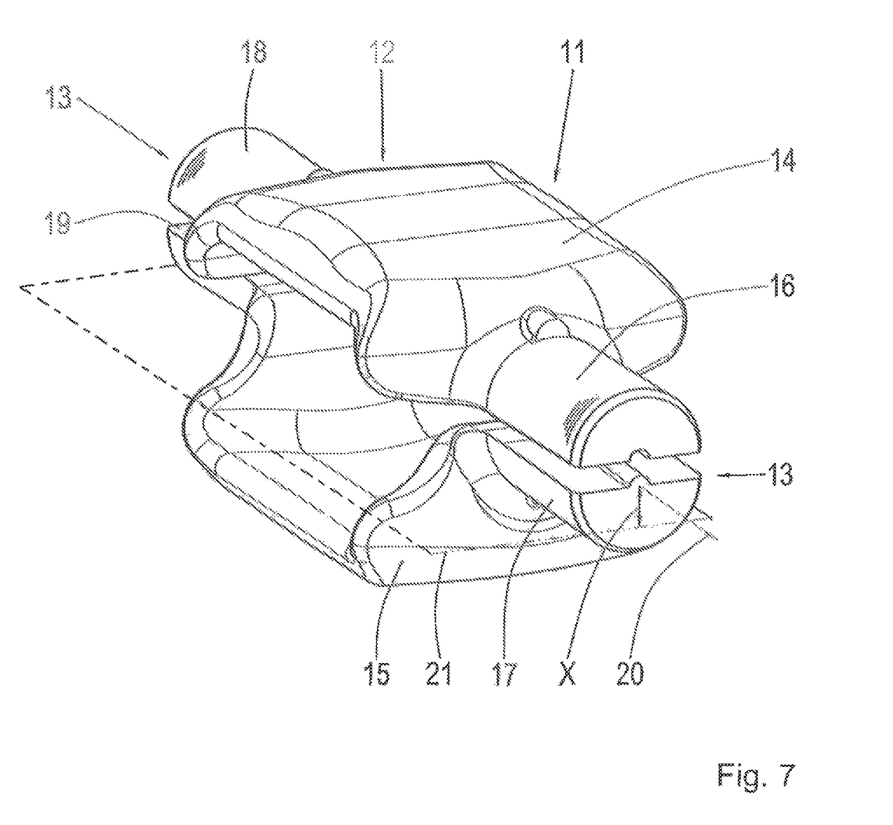
FIG. 7: A first embodiment of the bearing mechanism for a transverse leaf spring, shown in perspective.

FIG. 7 shows a first embodiment of a bearing mechanism 11 which can be fitted in the area of a vehicle axle of a vehicle, which comprises a holding device 12 for holding the transverse leaf spring 1 and a connecting device 13, in the area of which the holding device 12 can be connected to the vehicle. The holding device 12 and the connecting device 13 are designed such that the theoretical rotational axis 8 does not as described above pass through the neutral fiber of the transverse leaf spring 1, but is a distance away therefrom. In this way a distance between the theoretical rotational axis 8 of the cross-sectional plane 6 of the transverse leaf spring 1 and the actual rotational axes 10A to 10B that occur during operation is changed by an amount such that the constraining forces that occur in the transverse leaf spring 1 in the area of the bearing mechanism 11 during operation only occur to an extent which, in a favorable situation, do not affect the life of the transverse leaf spring 1 adversely.

The holding device 12 of the bearing mechanism 11 shown in FIG. 7 comprises two half-shells 14, 15 that can be connected to one another, which at least partially surround the transverse leaf spring 1 with interlock, wherein the half-shells 14 and 15 are each coupled to parts of the connecting device 13. The connecting device 13 comprises connection areas 16, 17 and 18, 19, each connected to the half-shells 14, 15 and of semi-cylindrical shape, which in the installed position of the transverse leaf spring 1 extend away from it in the longitudinal direction of the vehicle and which, in the assembled condition of the holding device 12, rest against one another with their flat sides and form a cylindrical area. In the installed position of the transverse leaf spring 1 centerlines 20 of the cylindrical areas 16, 17 and 18, 19 are offset in the vertical direction of the vehicle by a value X relative to a plane of symmetry 21 of the holding device 12 which passes essentially through the neutral fiber of the transverse leaf spring 1, these centerlines defining the position of the theoretical rotational axis 8 of the cross-sectional plane 6 of the transverse leaf spring 1.

Onto the cylindrical parts of the semi-cylindrical areas 16, 17 and 18, 19 that form the cylindrical area of the connecting device 13 are pushed in this case hollow-cylindrical additional connection areas of the connecting device 13, which are made with a higher elasticity than the connection areas 16, 17 and 18, 19, and which can preferably be made from a rubbery-elastic plastic material. In turn, over the rubbery elastic additional connection areas further connection areas of the connection device 13 are fitted, in the area of which the bearing mechanism 11 is connected to the vehicle. In this way jouncing and rebound movements that occur during operation of the transverse leaf spring 1 and rotation movements of the transverse leaf spring 1 that result from these in the area of the bearing mechanism 11 or in the area of the additional rubbery-elastic connection areas are enabled, without thereby impairing the desired wheel-guiding functions and at the same time with low constraining forces in the area of the transverse leaf spring 1.

Figure 8:
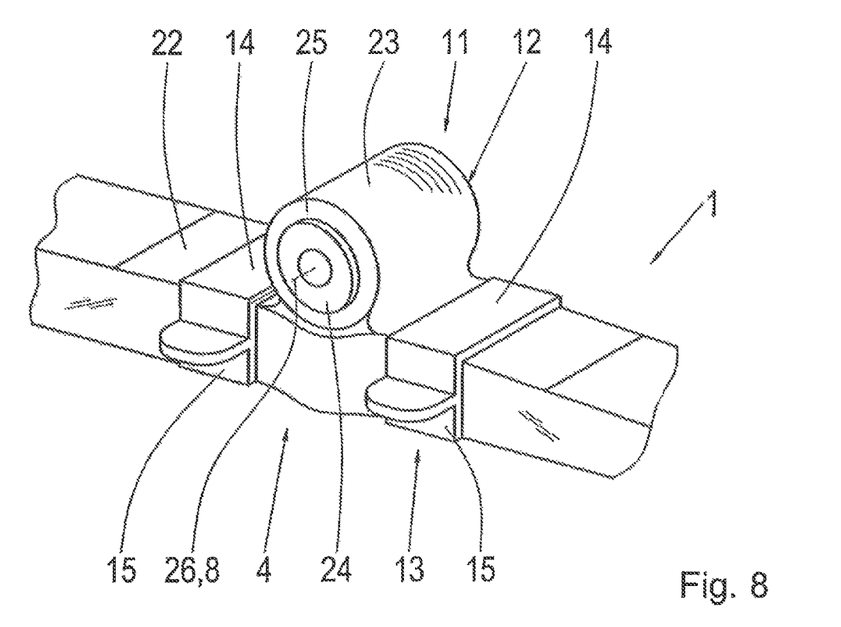
FIG. 8: A second embodiment of the bearing mechanism for a transverse leaf spring.

FIG. 8 shows a second embodiment of the mounting device 11 in which, in the installed position of the transverse leaf spring 1, the connecting device 13 is functionally connected to the holding device 12 by way of an upper side 22 of the transverse leaf spring 1. The connecting device 13 according to FIG. 8 comprises a connection area 23 attached to the holding device 12, which in this case is in the form of a hollow cylinder with a high component rigidity. A further connection area 24 is also in the form of a hollow cylinder or sleeve and is surrounded by the connection area 23 or arranged inside the latter. Between the connection area 23 and the further connection area 24, which latter also has a high component rigidity, is provided an additional connection area 25 whose component elasticity is higher than those of the connection areas 23 and 24 in order to enable movements of the transverse leaf spring 1 under the lowest possible constraining forces and at the same time provide the desired wheel guiding functions by the transverse leaf spring. The bearing mechanism 11 is connected to the vehicle body by way of the further connection area 24, and a centerline 26 of the connection areas 23 to 25 defines the position of the theoretical rotational axis 8 of the cross-sectional plane 6 of the transverse leaf spring 1.

Figure 9:
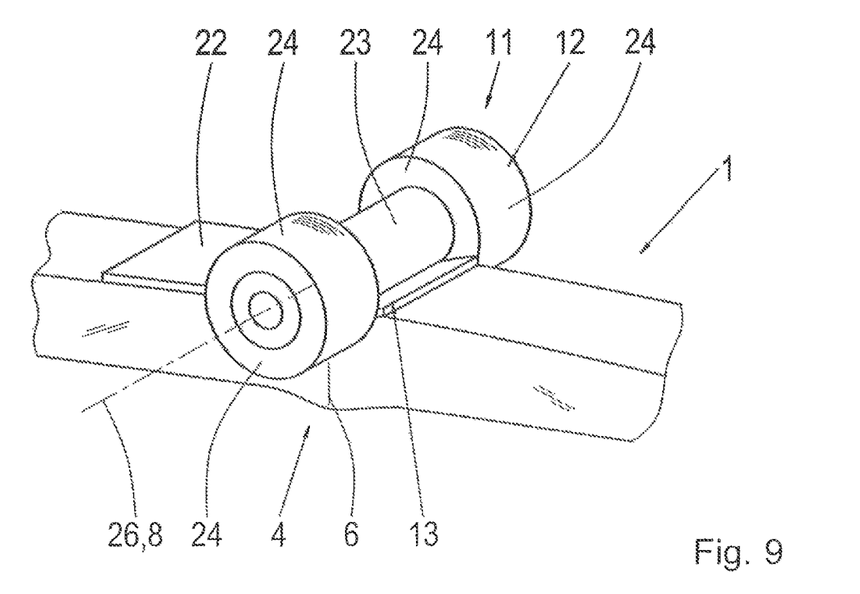
FIG. 9: A third embodiment of the bearing mechanism for a transverse leaf spring.

FIG. 9 shows a third example embodiment of the bearing mechanism 11, which like the second example embodiment of the bearing mechanism 11 in FIG. 8 is designed as a so-termed circular bearing mechanism. In the design of the bearing mechanism 11 according to FIG. 9, in the installed position of the transverse leaf spring 1 the connecting device 13 is arranged in part in front of and in part behind the transverse leaf spring 1 in the longitudinal direction of the vehicle. In this case the connection area 23 of the connecting device 13 functionally connected to the holding device 12, which latter is designed essentially like the holding device 12 according to FIG. 8 and which is only partly visible in FIG. 9, extends beyond the transverse leaf spring 1 in each direction in the longitudinal direction of the vehicle. Over the ends of the connection area 23 that extend beyond the transverse leaf spring 1 in the longitudinal direction of the vehicle are pushed the hollow-cylindrical or sleeve-like additional connection areas 24, which are again made rubbery-elastic and which surround the connection area 23. On the additional connection areas 24 are in turn fitted further connection areas 25, in the area of which the bearing mechanism 11 can be connected to the vehicle body or to an axle carrier. The position of the theoretical rotational axis 8 of the cross-sectional plane 6 of the transverse leaf spring 1 is again defined by the centerline 26 or line of symmetry of the bearing mechanism 11, and in this third embodiment of the bearing mechanism 11 shown in FIG. 9 smaller distances between the off-center position of the theoretical rotational axis 8 and the neutral fiber of the transverse leaf spring 1 can be obtained than with the second embodiment of the bearing mechanism 11 according to FIG. 8.

In all the embodiments of the bearing mechanism 11 shown in the drawings the center of the mounting design of the bearing mechanism 11 is displaced compared with known bearing mechanisms, in such manner that for the transverse leaf spring 1 there is an off-center center of rotation, which is substantially closer to the actual rotational axes 10A to 10B, in order to be able to minimize to the desired extent constraining forces in the area of the transverse leaf spring 1 that have an adverse effect upon its life. The mounting design of the bearing mechanism 11 is in each case more advantageously positioned in the area of the actual rotational axes 10A to 10B, for which the least possible damage in the area of the transverse leaf spring 1 has been determined for numerous load situations of the transverse leaf spring.

INDEXES

1 Transverse leaf spring
2, 3 End area of the transverse leaf spring
4, 5 Central area of the transverse leaf spring
6, 7 Cross-sectional plane of the transverse leaf spring
6A Tilted operating condition of the cross-sectional plane of the transverse leaf spring
8, 9 Theoretical rotational axis
10 Actual rotational axis
10A to 10B Actual rotational axis
11 Mounting device
12 Holding device
13 Connecting device
14, 15 Half-shells
16 to 19 Connection area
20 Centerline
21 Plane of symmetry of the holding device
22 Upper side of the transverse leaf spring
23 Connection area
24 Additional connection area
25 Further connection area
26 Centerline
X Plane of symmetry

The invention claimed is:

1. An asymmetrical bearing mechanism for a transverse leaf spring, mounted in an area of an axle of a vehicle and being formed with a holding device and a connecting device;
   the holding device being formed by a minor portion and a major portion to matingly hold the transverse leaf spring therebetween, the holding device having a first plane passing through a neutral fiber of the transverse leaf spring and bisecting an interior space formed by joining the minor and major portions of the holding device, the minor portion defining a minor portion of the interior space and the major portion defining a major portion of the interior space, the first plane extending in transverse and longitudinal directions of the vehicle;
   the connecting device comprising a first pair and a second pair of semi-cylindrical portions being connected to and extending from the minor portion and the major portion of the holding device, respectively, in the longitudinal direction of the vehicle;
   the first pair of semi-cylindrical portions being located on the minor portion of the holding device and the second pair of semi-cylindrical portions being located on the major portion of the holding device;
   the first pair and the second pair of semi-cylindrical portions forming cylindrical areas having a centerline collinear with a rotational axis that extends along the longitudinal direction of the vehicle, such that when the holding device holds the transverse leaf spring, the centerline is spaced away, by a distance x from the first plane in a vertical direction of the vehicle, above the first plane of the holding device;
   the major portion having an exterior surface and the minor portion having an exterior surface, the exterior surface of the major portion being spaced a first distance away from the centerline and the exterior surface of the minor portion being spaced a second distance away from the centerline such that the first distance is greater than the second distance in the vertical direction;
   the asymmetrical bearing mechanism is evidenced by the difference between the first distance and the second distance in order to minimize constraining forces in the transverse leaf spring during jouncing and rebound of the transverse leaf spring during operation of the vehicle.

2. The bearing mechanism according to claim 1, wherein the holding device has a top surface and a bottom surface that face away from each other in the vertical direction, and the connecting device comprises cylindrical connecting areas that are connected to opposite longitudinal ends of the holding device, the cylindrical connecting areas define the centerline of the connecting device that is collinear with the rotational axis of the cross-sectional plane of the transverse leaf spring and spaced vertically closer to the top surface of the holding device than the bottom surface of the holding device.

3. The bearing mechanism according to claim 1, wherein, when the transverse leaf spring is in the installed position, the connecting device is arranged at least partially over an upper surface of the transverse leaf spring in the vertical direction of the vehicle.

4. The bearing mechanism according to claim 1, wherein, when the transverse leaf spring is in the installed position, the connecting device is arranged at least partially in front of and partially behind the transverse leaf spring in relation to the longitudinal direction of the vehicle.

5. The bearing mechanism according to claim 2, wherein flat sides of the first pair and the second pair of semi-cylindrical portions mate and define a plane of the connecting device such that the centerline of the cylindrical areas are positioned offset in the vertical direction of the vehicle closer to the top surface of the holding device than the bottom surface of the holding device.

6. The bearing mechanism according to claim 2, wherein the minor and the major portions of the holding device having recesses for receiving convex areas of the transverse leaf spring, the minor portion forming the top surface of the holding device and the major portion forming the bottom surface of the holding device, and from the centerline of the cylindrical areas each of the recesses of the minor and the major portions has a vertical dimension, the vertical dimension of the recess of the minor portion being less than the vertical dimension of the recess of the major portion.

* * * * *